United States Patent
Van Noten et al.

[11] Patent Number: 5,625,167
[45] Date of Patent: Apr. 29, 1997

[54] CABLE SEAL

[75] Inventors: Lodewijk C. M. Van Noten, Leuven, Belgium; Tommy Petersen, Ishoej, Denmark

[73] Assignee: N.V. Raychem S.A., Kessel-Lo, Belgium

[21] Appl. No.: 290,845

[22] PCT Filed: Feb. 12, 1993

[86] PCT No.: PCT/GB93/00294

§ 371 Date: Aug. 19, 1994

§ 102(e) Date: Aug. 19, 1994

[87] PCT Pub. No.: WO93/17477

PCT Pub. Date: Sep. 2, 1993

[30] Foreign Application Priority Data

Feb. 25, 1992 [GB] United Kingdom ............... 9203943

[51] Int. Cl.⁶ ..................................................... H01R 4/22
[52] U.S. Cl. ................................. 174/77 R; 174/138 F; 174/93
[58] Field of Search ........................ 174/87, 138 F, 174/77 R, 93, 88 R; 411/353, 352, 514, 517, 518, 530

[56] References Cited

U.S. PATENT DOCUMENTS

| | | | |
|---|---|---|---|
| 2,264,803 | 12/1941 | Jacobs | 174/77 |
| 2,357,591 | 9/1944 | Kleinfelder | 174/84 |
| 2,688,651 | 4/1954 | Blake | 174/93 |
| 2,771,502 | 11/1956 | King et al. | 174/92 |
| 3,984,623 | 10/1976 | Worden | 174/138 F |
| 4,079,193 | 3/1978 | Channell | 174/138 F |
| 4,194,082 | 3/1980 | Campbell | 174/74 |
| 4,484,022 | 11/1984 | Eilentropp | 174/84 R |
| 4,501,927 | 2/1985 | Sievert | 174/93 |
| 4,625,073 | 11/1986 | Breesch et al. | 174/72 R |
| 4,701,574 | 10/1987 | Shimirak et al. | 174/93 |
| 4,721,832 | 1/1988 | Toy | 174/87 |
| 4,839,473 | 6/1989 | Fox et al. | 174/138 F |
| 5,059,748 | 10/1991 | Allen et al. | 174/87 |
| 5,151,239 | 9/1992 | King, Jr. | 264/274 |
| 5,278,355 | 1/1994 | Read et al. | 174/88 R |
| 5,322,972 | 6/1994 | Fitch et al. | 174/88 R |
| 5,446,823 | 8/1995 | Bingham et al. | 174/93 |

FOREIGN PATENT DOCUMENTS

| | | |
|---|---|---|
| 0191609A1 | 8/1986 | European Pat. Off. . |
| 1470110 | 1/1967 | France . |
| 3932133A1 | 4/1991 | Germany . |
| 1511580 | 5/1978 | United Kingdom . |
| WO90/05401 | 5/1990 | WIPO . |

Primary Examiner—Kristine L. Kincaid
Assistant Examiner—Marc Diamant Machtinger
Attorney, Agent, or Firm—William D. Zahrt, II; Herbert G. Burkard

[57] ABSTRACT

A method of forming a cable seal which includes positioning a sealing material around the cable, positioning a housing around the sealing material, and subsequently positioning at the housing a restricting element that can restrict movement of the sealing material out of an outlet of the housing. The restricting element is a snap or interference fit to the housing and extends to the outlet.

13 Claims, 3 Drawing Sheets

CABLE SEAL

The present invention relates to a method and article for forming a cable seal, in particular for forming a ready access butt closure for a telecommunications cable splice.

Cable splices have to be sealed against the environment to prevent damage to the cable conductors and connectors joining them. When a cable splice is made, cable jacket is stripped back from the ends of the cables to be spliced to expose the conductors to be connected. After the splice is made a so-called splice case, or splice closure, is built up around the splice.

In certain instances it is desirable for the splice to be of butt, rather than in-line configuration. This means that two or more cables lying side-by-side with their ends pointing in the same direction are spliced together. An advantage is that a housing comprising a domed cover can be slid over the resulting splice. A single seal then has to be made where the cables leave an outlet of the housing. In the case of an in-line splice (made between ends of cables that face one another) two seals need to be made, one at each end of a generally cylindrical housing that surrounds the splice. Also, the housing of a butt closure need not be of the wrap-around type and can still be removed.

Various cable splice closures have been proposed in the past, a few of which will be reviewed below.

U.S. Pat. No. 4,194,082 (Campbell) disclosed a generally dome-shaped closure having a heat-shrinkable end that is shrunk down around an ingoing cable. As a result of heat-shrinkage, a seal is made around the cable, isolating the inside of the closure from the environment.

WO 90/05401 (Raychem) discloses an in-line splice closure that can avoid the use of heat-shrinkable materials. A sealing material, for example a gel, is provided as part of end seals that seal gaps between in-going and out-going cables of a splice case, a central part of which comprises a generally cylindrical housing. The end seals comprise the gel between structures that can be brought together to deform the gel to seal it to the cables and the central housing.

U.S. Pat. No. 4,701,574 (Shimirak et al) also discloses a closure which includes a cable end seal and a central generally cylindrical housing. The end seals have an outer convoluted surface that mates with a convoluted surface of the cylindrical housing. In this way the end seals are retained in appropriate positions at the ends of the housing.

U.S. Pat. No. 3,984,623 (Worden) discloses a cable splice housing having a hollow, tubular, plastics body, an end of which carries a plug, the opposite end being blind. A clamp is provided around the hollow body for clamping the body around the plug. The housing is filled with grease.

U.S. Pat. No. 2,771,502 (J H King et al) discloses a splice closure comprising an elongate housing, each end of which has clamping means for gripping therein outwardly-turned tabs of the jackets of the cables being spliced. This provides axial pull-strength across the splice; load is carried by the housing rather than by connectors and conductors of the cable. A resilient compressible bushing seals each end of the closure and is connected to the gripping means by a bolt.

U.S. Pat. No. 2,688,651 (J Blake) discloses a cable joint protector comprising a tubular enclosing sleeve for positioning over a cable joint with the cables extending out of each end of the sleeve. The sleeve having at each end a sealing arrangement comprising an external thread on the sleeve, and an end cap having an internal thread such that the cap can be screwed onto an end of the sleeve. A resilient plug having a hole for the cable, is slid along each cable into the end of the sleeve. The cap is then screwed onto the sleeve causing the plug to be deformed into sealing engagement with the cable and the inside of the sleeve.

This disclosure of each of the above-mentioned patent specifications is incorporated herein by reference.

Whilst satisfactory seals can be made using the techniques described above, each has its drawbacks. Many of them are complex and expensive and take time to carry out.

We have now discovered that a simple seal can be made using a sealing material located by means of a restricting means, preferably of snap or interference fit generally onto a housing.

Thus, in one embodiment the invention provides a method of forming a cable seal which comprises positioning a sealing material around the cable;

positioning a housing around the sealing material; and subsequently positioning at the housing restricting means that can restrict movement of the sealing material out of an outlet of the housing;

characterized in that the restricting means is a snap or interference fit to the housing and extends into the outlet.

The invention also provides an assembly (optionally supplied in kit form) for carrying out the method of the invention. Such an assembly preferably comprises a two part housing, one part for surrounding the sealing material and the other comprising a dome-shaped or other cover, a gel or other sealing material, and the restricting means.

The sealing material preferably comprises a gel or other material having a cone penetration (measured by a modified version of ASTM D217) within the range 30–400 ($10^{-1}$ mm), and/or an ultimate elongation (measured by ASTM D412) greater than 100%, with substantially elastic deformation to an elongation of at least 100%. Generally such materials comprise an oil or other liquid-extended polymer composition. the composition preferably contains a three dimensional cross-linked molecular structure. Such structures may be formed from block copolymers having relatively hard blocks and relatively elastomeric blocks, examples of such copolymers including styrene-diene block copolymers (for example styrene isoprene or styrene-butadiene block copolymers) or styrene-ethylene butylene-styrene triblock copolymers. Examples of triblock copolymers include those supplied by Shell under the trademark kraton. These block copolymers are extended by oils. The resulting gels will in general be thermoplastic, as is preferred for ease of manufacture of the product. In one embodiment a gel is used comprising 10–14% by weight of the copolymer Kraton G1651, 84–88% of a mineral oil and minor amounts of a stabilizer etc. Other gels can be used if desired, for example those based on polyurethanes or silicones. Harder gels may be made by reducing the oil content, for example by using 78–82% oil and if desired a mixture of block copolymers such as Kraton G1651 and Kraton G1650 preferably about 10% of each.

In order to aid positioning of the housing around the sealing material, the sealing material may be extended axially with respect to the cable thereby contracting it transversely. In any case the sealing material is preferably positioned around the cable (or cables) and the housing then slid along the cable and over the sealing material. Alternatively, the cable may remain fixed with respect to the housing and the sealing material slid with respect to both of them. The sealing material preferably comprises a generally cylindrical plug having an axial hole therethrough for each cable. Such holes preferably communicate with the outer circumference of the plug by a slit through the sealing material. In this way the plug can be "wrapped-around" the cable, obviating the need for access to a free end of the cable.

Where the cable seal is to seal a splice, two or more cables will generally lie side-by-side. In this case the sealing material will be positioned around the cables and form a seal between them, and also between the cables and the surrounding housing.

The restricting means is preferably a push-on fit such as a snap fit or interference fit around an external surface of the housing, and it preferably has at least one projection that extends through a hole in the housing into the outlet thereof. Such a design is generally preferable to one where some retaining means screws into an end of the housing since that could be awkward to carry out, especially where two or more cables are being sealed.

Furthermore, the restricting means preferably comprises a resilient metal or plastics band having at least one inwardly, substantially radially-extending projection.

The housing may be of any suitable design, but we prefer that it comprises (a) a first part that surrounds the sealing material, and (b) a second part, preferably substantially dome-shaped, that comprises a cover for the first part.

The second part is preferably removably attached to the first part so that access to the cables sealed by the housing may readily be made. The two parts may be held together by a circular or other clamp, optionally together with an O-ring or other sealing means positioned between two abutting surfaces of the two parts.

The invention is further illustrated with reference to the accompanying drawings in which FIG. 1 shows a splice closure;

Figure 1:
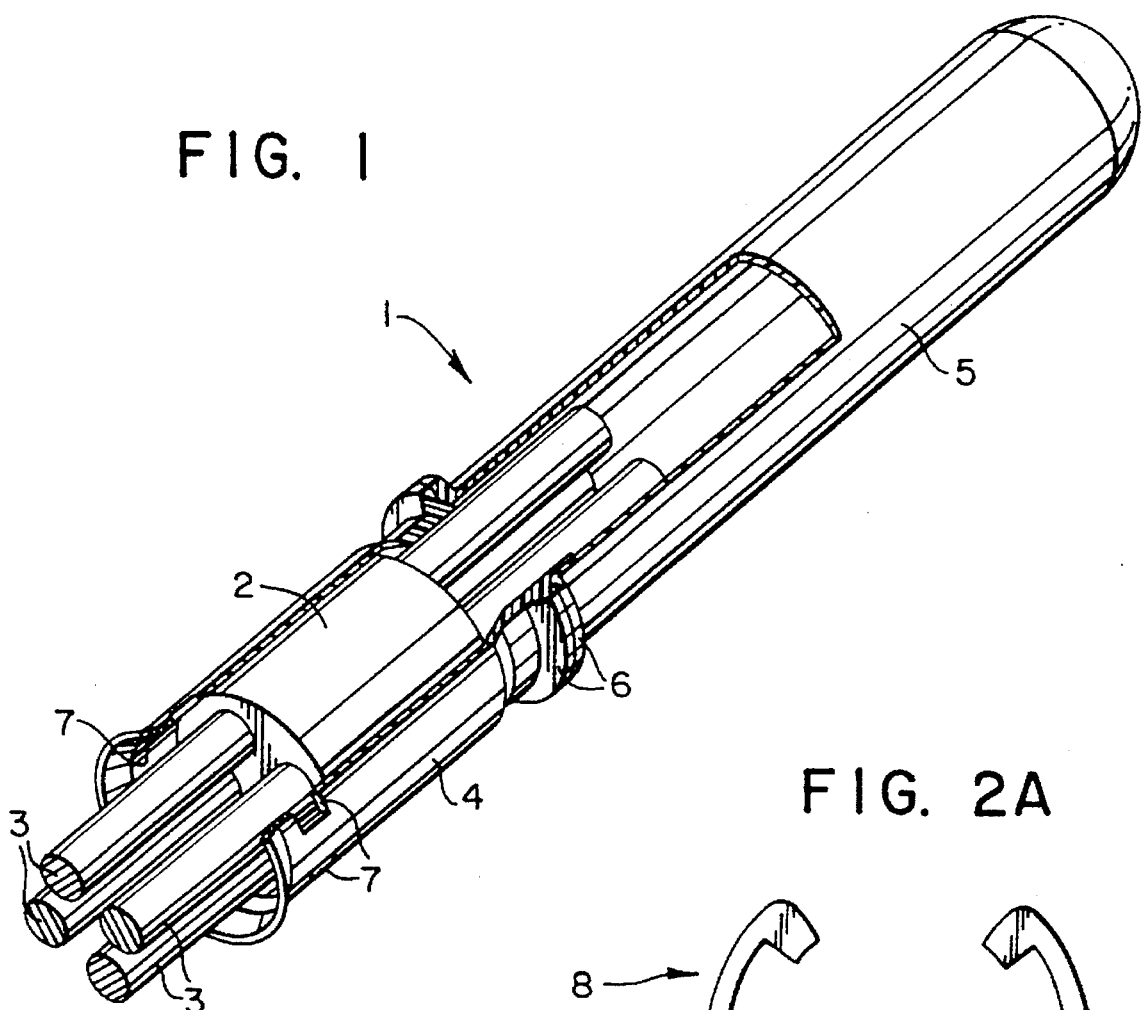

FIG. 1 shows a splice closure 1 incorporating a gel or other sealing material 2 around cables 3. A first part of a housing 4 surrounds the sealing material 2, and a second part 5 of a housing is joined to the first part by means of, for example, a circular clamp (not shown) that brings together flanges 6. The first part 4 of the housing has holes 7 or other means for receipt or interengagement with a restricting means. The restricting means is intended to limit movement, preferably movement axially with respect to cables 3, of sealing material 2.

Figure 2A:
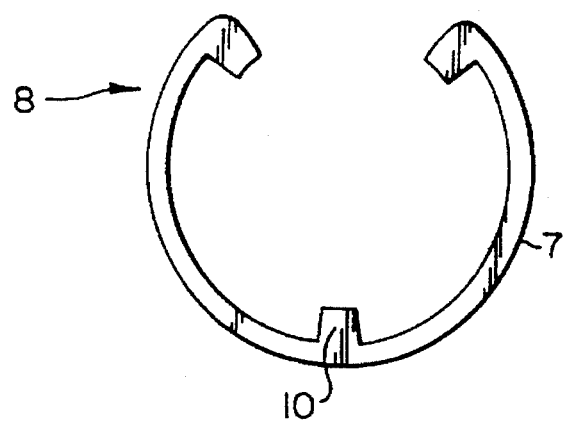
FIGS. 2A and 2B show a restricting means in the form of a band.
Figure 2B:
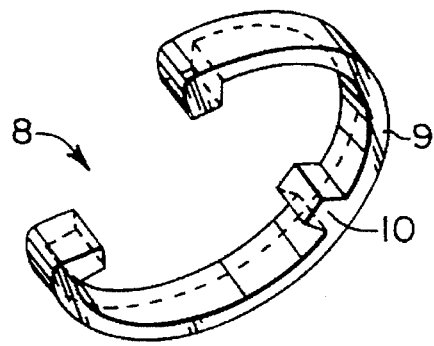

A restricting means 8 is shown in plan view in FIG. 2A and in perspective view in FIG. 2B. The restricting means comprises a band 9 with inwardly projecting projections 10. These projections extend through holes 7 of FIG. 1.

Figure 3A:
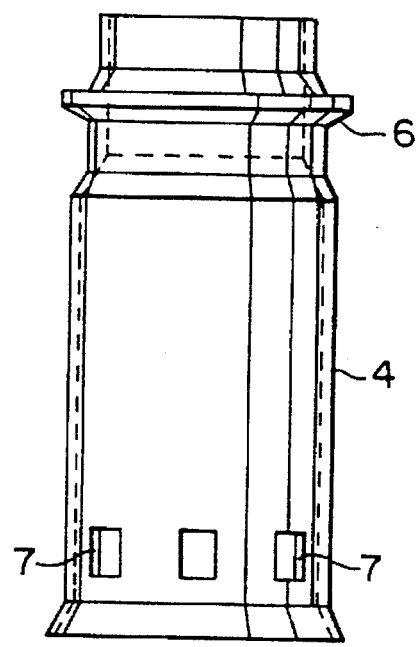
FIGS. 3A and 3B show first parts of a housing that receive a sealing material and a restricting means.
Figure 3B:
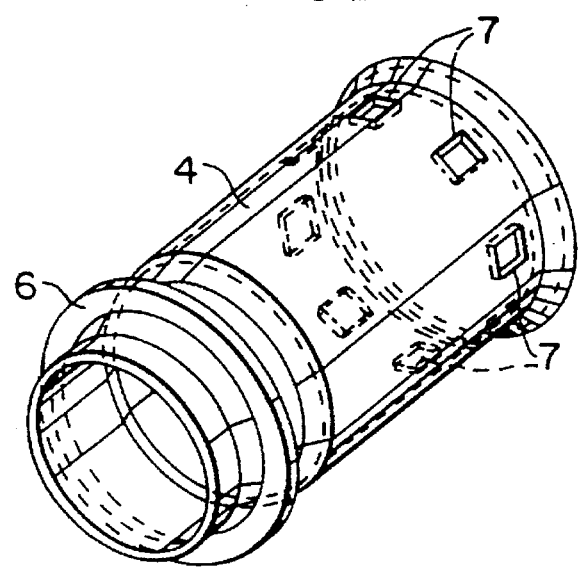

The first part of the housing is shown in more detail in FIGS. 3A and 3B.

Figure 4A:
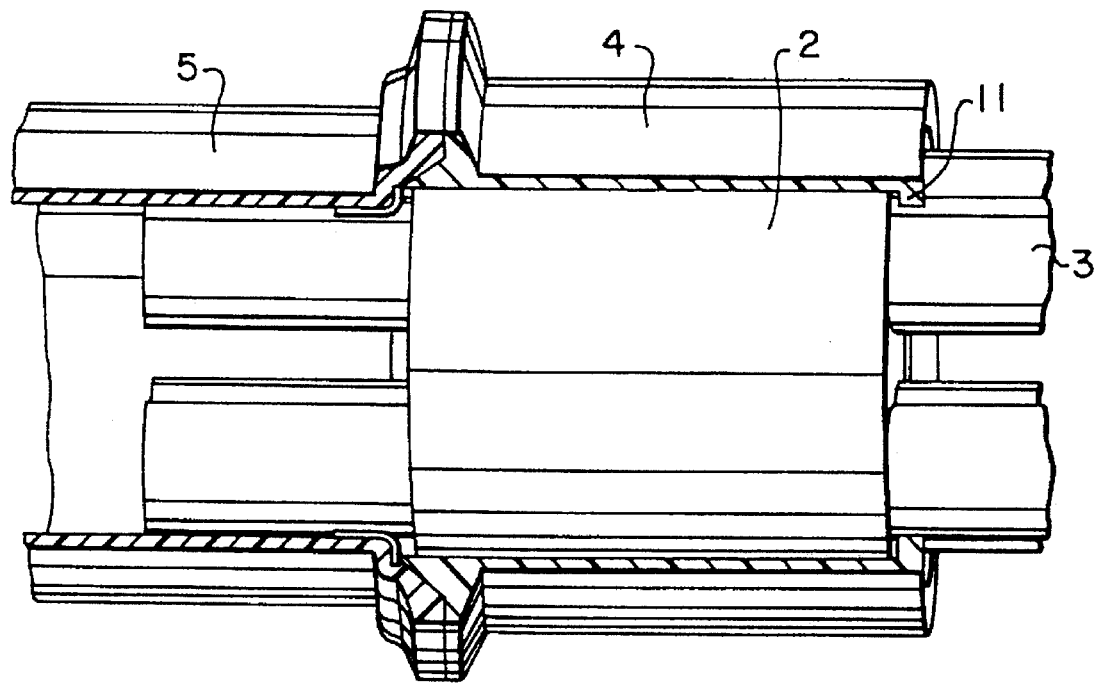
FIGS. 4A and 4B show alternative housings.
Figure 4B:
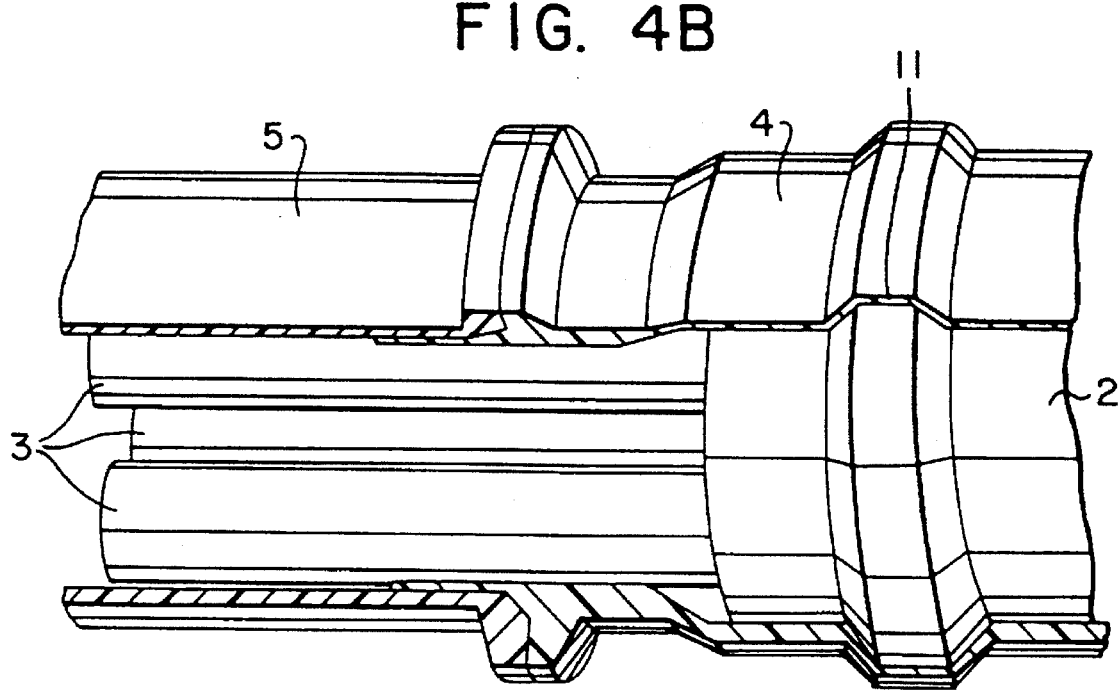

FIGS. 4A and 4B show inventive alternatives wherein the sealing material 2 is trapped by means 11 formed as part of the housing.

We claim:

1. A method of forming a seal on a cable, which comprises:

positioning a sealing material around the cable;

positioning a housing around the sealing material; and subsequently positioning restricting means on the housing, said restricting means being capable of restricting movement of the sealing material out of an outlet of the housing;

wherein the restricting means comprises a resilient metal or plastics band which is a push-on fit around an external surface of the housing and which has at least one inwardly substantially radially-extending projection that extends through a hole in the housing into said outlet thereof.

2. A method according to claim 1, in which the sealing material comprises a gel.

3. A method according to claim 1, further comprising extending the sealing material axially with respect to the cable, thereby contracting it transversely, before positioning the housing around it.

4. A method according to claim 1, further comprising positioning the sealing material around two or more cables side-by-side.

5. A method according to claim 4, further comprising sealing a cable butt splice.

6. A method according to claim 1, in which the housing comprises:

(a) a first part that surrounds the sealing material and (b) a second part that comprises a cover for the first part.

7. An assembly for forming a seal on a cable, which comprises:

(a) housing for positioning around a cable and having an outlet for the cable;

(b) a sealing material for positioning around the cable to form a seal between the cable and the housing; and (c) a restricting means for restricting movement of the sealing material out of the outlet of the housing, the restricting means comprising a resilient metal or plastics band which is a push-on fit around an external surface of the housing and which has at least one inwardly substantially radially-extending projection that extends, in use, through a hole in the housing into the outlet thereof, thereby restricting the movement of the sealing material.

8. A method according to claim 2, further comprising extending the sealing material axially with respect to the cable, thereby contracting it transversely, before positioning the housing around it.

9. A method according to claim 2, further comprising positioning the sealing material around two or more cables side-by-side.

10. A method according to claim 3, further comprising positioning the sealing material around two or more cables side-by-side.

11. A method according to claim 10, further comprising sealing a cable butt splice.

12. A method according to claim 2, in which the housing comprises:

(a) a first part that surrounds the sealing material and (b) a second part that comprises a cover for the first part.

13. A method according to claim 10, in which the housing comprises:

(a) a first part that surrounds the sealing material and (b) a second part that comprises a cover for the first part.

* * * * *